UNITED STATES PATENT OFFICE 2,027,404

BITUMINOUS EMULSION

James B. Small, East Cleveland, Ohio, assignor to The Glidden Company, Cleveland, Ohio, a corporation of Ohio No Drawing. Application May 26, 1933, Serial No. 673,112

6 Claims. (Cl. 134—1)

This invention deals with the general class of bituminous emulsions, and has as its object the production of an asphalt-water emulsion which may be frozen, and which, on thawing, will not break. I contemplate the production of such an emulsion by the use of a soap, prepared by the saponification of heat treated rosin.

Emulsions of water and asphalt are of great economic importance, and occupy a prominent place in the arts. Essentially, they consist of asphalt, water and an emulsifying agent which keeps the emulsion together. The type of asphalt employed has some effect on the character of the emulsion; but an asphalt must be chosen of definite hardness, melting point and other physical characteristics, to produce the different results desired. The emulsifying agent, because it can be varied as to kind and quantity, plays the important role in determining the stability and working properties of an emulsion. Various soaps, sulfonated oils, salts, colloidal clay (bentonite, etc.) and other materials have been suggested for use as protective colloids; and successful emulsions have been prepared with a wide range of these agents.

A serious disadvantage of most of the present day emulsions, however, has been their tendency to break on being subjected to freezing temperatures. The water, when chilled below 32° F. naturally tends to freeze; and when the emulsion is thawed by gentle heat to the point where the water again becomes liquid, the asphalt and water are no longer together but have separated into two layers. This is a fertile source of trouble, particularly in the more northerly portions of the country. Winter shipments must be made in heated freight cars; and it is necessary to warn customers of the dangers of freezing. In spite of precautions and warnings, carelessness results in the freezing of considerable quantities of emulsion every winter—an economic waste.

I have discovered that asphalt water emulsions may be prepared which may be frozen to temperatures as low as −60° F., and remain emulsified after thawing. These emulsions are made by employing as a protective colloiding agent the soaps of heat treated common rosin.

Rosin is essentially an acid (abietic acid) mixed with impurities, and some hydrocarbon bodies called terpenes. It has an acid number of about 160–170, and a saponification value of 170–180. When it is treated in an open kettle at 500–600° F., a loss in weight occurs and the saponification number decreases. After two hours the saponification value has dropped to 130. I do not know the nature of the chemical change involved; from the drop in saponification value, and the loss of weight, I assume it to be a condensation of molecules of abietic acid across the carboxyl groups. The change, whatever its nature, is very definite; and where ordinary rosin soaps have no protective effect on the freezing of emulsions, soaps prepared from rosin treated as outlined above do prevent breaking in frozen emulsions.

In preparing the rosin, the heat-treatment may be varied slightly; longer treatment is merely additional expense, while shorter treatment may result in a product which has not been sufficiently converted. Where lower temperatures are employed in the heat-treatment more time is necessary.

Either a sodium or potassium soap may be made with the rosin. I prefer to prepare a neutral sodium soap, calculating the amount of caustic necessary from the saponification number of the treated rosin. The soap, when on the alkaline side, has a tendency to graininess; and there appears to be some loss of protective action as compared to the neutral or very slightly acid soap. The soap may be dried, or it may be used in the form of a thick paste containing some water, as prepared.

The emulsion is made in the normal manner, using the desired type of asphalt, and water. The soap content is variable, depending on the hardness of the asphalt, and the type of emulsions wanted. For a quick-breaking emulsion, I employ from 1 to 4 percent of the weight of asphalt of soap, depending on the asphalt; for a slow breaking emulsion I use from 3 to 7 percent.

Typical examples of my invention are:

*I. Fast-breaking soft asphalt emulsion*

349# Mexican petroleum asphalt—soft
22¾# neutral soap paste (55% water—45% soap).
31½ gallons water.

Dissolve the soap in 4 gallons of water—add the melted asphalt, with constant stirring, then add the balance of the water, continuing the stirring. The resultant emulsion was frozen to minus 60° F.; on thawing no break was noticeable.

II. Fast-breaking hard asphalt emulsion

349# hard Mexican petroleum asphalt.

12# dry soap ⎫ Paste prepared by saponification of heat treated rosin with theoretical quantity of caustic soda solution.
18# water ⎭

237# water—added.
Mix as indicated in Example I.

III. Slow breaking hard asphalt emulsion

349# hard Mexican petroleum asphalt.
49# neutral soap paste (45% soap)
17½ gallons water.
Mix as indicated in Example I.

I may, of course, employ other asphalts than those indicated above in the preparation of my emulsions.

Having thus described my invention, what I claim is:

1. A bituminous emulsion, in which the emulsifying agent is a soap of rosin heat-treated at 500–600° F.

2. A bituminous emulsion, in which the emulsifying agent is a soap of rosin heat-treated at 500–600° F. for two hours.

3. A bituminous emulsion which is substantially non-breakable on freezing and subsequent throwing, containing as emulsifying agent a soap of rosin heat treated to reduce the saponification value to approximately 130.

4. A bituminous emulsion which is substantially non-breakable on freezing and subsequent thawing, containing as emulsifying agent a sodium soap of rosin heat treated to reduce the saponification value to approximately 130.

5. A bituminous emulsion which is substantially non-breakable on freezing and subsequent thawing, containing as emulsifying agent a soap of rosin heat treated to reduce the saponification value to approximately 130 or lower.

6. A bituminous emulsion which is substantially non-breakable on freezing and subsequent thawing, containing as emulsifying agent a sodium soap of rosin heat treated to reduce the saponification value to approximately 130 or lower.

JAMES B. SMALL.